US009998130B2

(12) United States Patent
Pilly et al.

(10) Patent No.: US 9,998,130 B2
(45) Date of Patent: Jun. 12, 2018

(54) METHOD TO PERFORM CONVOLUTIONS BETWEEN ARBITRARY VECTORS USING CLUSTERS OF WEAKLY COUPLED OSCILLATORS

(71) Applicants: HRL Laboratories, LLC, Malibu, CA (US); University of Pittsburgh—Of the Commonwealth System of Higher Education, Pittsburgh, PA (US); Anna Balazs, Pittsburgh, PA (US)

(72) Inventors: Praveen K. Pilly, West Hills, CA (US); Jose Cruz-Albrecht, Oak Park, CA (US); Narayan Srinivasa, Hillsboro, OR (US); Steven P. Levitan, Pittsburgh, PA (US); Donald M. Chiarulli, Pittsburgh, PA (US)

(73) Assignees: HRL Laboratories, LLC, Malibu, CA (US); University of Pittsburg—Of The Commonwealth System Of Higher Education, Pittsburgh, PA (US)

( * ) Notice: Subject to any disclaimer, the term of this patent is extended or adjusted under 35 U.S.C. 154(b) by 160 days.

(21) Appl. No.: 15/203,596

(22) Filed: Jul. 6, 2016

(65) Prior Publication Data

US 2018/0013439 A1 Jan. 11, 2018

(51) Int. Cl.
*H03K 3/02* (2006.01)
*H03L 7/26* (2006.01)
(Continued)

(52) U.S. Cl.
CPC ................. *H03L 7/26* (2013.01); *G06T 5/20* (2013.01); *G09G 3/20* (2013.01); *G09G 5/001* (2013.01);
(Continued)

(58) Field of Classification Search
CPC ......... H03K 3/0315; H03D 7/14; H03M 1/66; G06T 5/20; G06T 2200/08; G06T 15/20;
(Continued)

(56) References Cited

U.S. PATENT DOCUMENTS

| 5,355,435 A | 10/1994 | Deyong et al. |
| 7,822,698 B1 | 10/2010 | Cruz-Albrecht et al. |

(Continued)

OTHER PUBLICATIONS

T. Shibata, R. Zhang, S.P. Levitan, D. Nikonov and G. Bourianoff, "CMOS Supporting Circuitries for Nano-Oscillator-Based Associative Memories," *Proc. Intl. Workshop on Cellular Nanoscale Networks and their Applications*, 2012.

(Continued)

*Primary Examiner* — Arnold Kinkead
(74) *Attorney, Agent, or Firm* — Ladas & Parry

(57) ABSTRACT

A method to perform convolutions between arbitrary vectors includes estimating a first degree of match for a difference between a first vector having a plurality of first elements and a second vector having a plurality of second elements using a first cluster of coupled oscillators, estimating a second degree of match for the first vector using a second cluster of coupled oscillators, estimating a third degree of match for the second vector using a third cluster of coupled oscillators, deriving a first squared $L^2$ norm from the first degree of match, deriving a second squared $L^2$ norm from the second degree of match, deriving a third squared $L^2$ norm from the third degree of match, adding the second squared $L^2$ norm and the third squared $L^2$ norm, and subtracting the first squared $L^2$ norm to form a sum, and dividing the sum by two.

27 Claims, 10 Drawing Sheets

(51) Int. Cl.
*H03K 4/50* (2006.01)
*H03M 1/66* (2006.01)
*H04L 9/08* (2006.01)
*G09G 3/20* (2006.01)
*G09G 5/00* (2006.01)
*H04N 19/156* (2014.01)
*H03K 3/03* (2006.01)
*H03D 7/14* (2006.01)
*G06T 5/20* (2006.01)
*H04L 9/12* (2006.01)

(52) U.S. Cl.
CPC .............. *H03D 7/14* (2013.01); *H03K 3/0315* (2013.01); *H03K 4/50* (2013.01); *H03M 1/66* (2013.01); *H04L 9/0838* (2013.01); *H04L 9/12* (2013.01); *H04N 19/156* (2014.11)

(58) Field of Classification Search
CPC ......... H04L 9/12; H04L 9/0838; H04L 9/001; G09G 3/02; G09G 5/001; H04N 19/156
USPC ........................................ 331/2, 57, 46, 143
See application file for complete search history.

(56) References Cited

U.S. PATENT DOCUMENTS

| | | | |
|---|---|---|---|
| 9,262,843 B1 | 2/2016 | Cruz-Albrecht | |
| 9,721,332 B2* | 8/2017 | Cruz-Albrecht | .......... G06T 5/20 |
| 2002/0038294 A1 | 3/2002 | Matsugu | |

OTHER PUBLICATIONS

S. P. Levitan, Y. Fang, D. H. Dash, T. Shibata, D. E. Nikonov and G. I. Bourianoff, "Non-Boolean Associative Architectures Based on Nano-Oscillators," *Proc. Intl. Workshop on Cellular Nanoscale Networks and their Applications*, 2012.

Levitan, S. P., Fang, Y., Carpenter, J. A., Gnegy, C. N., Janosik, N. S., Awosika-Olumo, S., Chiarulli, D.M, Csaba, G, & Porod, W. (2013). "Associative processing with coupled oscillators." In *ISLPED* (p. 235).

Sermanet, P., Eigen, D., Zhang, X., Mathieu, M., Fergus, R., & LeCun, Y. (2014). "Overfeat: Integrated recognition, localization and detection using convolutional networks." In *International Conference on Learning Representations (ICLR 2014)*, Apr. 2014.

Krizhevsky, A., Sutskever, I., & Hinton, G. E. (2012). "ImageNet classification with deep convolutional neural networks." In *Advances in neural information processing systems* (pp. 1097-1105).

Fang et al, "Modeling oscillator arrays for video analytic applications", IEEE/ACM International Conference on Computer-Aided Design (ICCAD) DOI:10.1109/ICCAD.2014.7001336, 2014, pp. 86-91.

Jennings et al., "HMAX Image Processing Pipeline with Coupled Oscillator Acceleration," 2014, IEEE Workshop on Signal Processing Systems (SiPS) DOI: 10.1109/SiPS.2014,6986101, Oct. 2014, pp. 1, 6, and 20-22.

Chiarulli et al., "A Computational Primitive for Convolution Based on Coupled Oscillator Arrays," International Symposium on Very Large Scale Integration (ISVLSI 2015), Paper No. 144, Montpellier, France, Jul. 8-10, 2015.

From U.S. Appl. No. 14/202,200 (now U.S. Pat. No. 9,262,843), Notice of Allowance dated Oct. 6, 2015.

Narayanan et al., "Video Analytics Using Beyond CMOS Devices," In: Proceedings of the conference on 2014 Design, Automation & Test in Europe, European Design and Automation Association, Mar. 24-28, 2014.

Nikonov et al., "Convolutional Networks for Image Processing by Coupled Oscillator Arrays," pp. 1-23, Sep. 15, 2014.

From: PCT/US2017/040779, International Search Report and Written Opinion dated Oct. 19, 2017.

* cited by examiner

METHOD TO PERFORM CONVOLUTIONS BETWEEN ARBITRARY VECTORS USING CLUSTERS OF WEAKLY COUPLED OSCILLATORS

STATEMENT REGARDING FEDERAL FUNDING

This invention was made under U.S. Government contract HR0011-13-C-0052. The U.S. Government has certain rights in this invention.

CROSS REFERENCE TO RELATED APPLICATIONS

This application relates to U.S. patent application Ser. No. 14/202,200, filed Mar. 10, 2014, which is incorporated herein as though set forth in full.

TECHNICAL FIELD

This disclosure relates to a method to perform convolutions between arbitrary vectors using clusters of weakly coupled oscillators.

BACKGROUND

A large number of signal processing applications, ranging from surveillance cameras to automobiles to airplanes to UAVs, need to perform filtering operations on large volumes of signals that are acquired by numerous sensors in real time. For example, prior art object recognition algorithms employ a deep learning network whose fundamental computation is a convolution operation.

In the prior art, coupled oscillators have been used to compute a degree-of-match (DoM) between two vectors, as described in References [2], [7], and [8], below, which are incorporated herein by reference. A DoM is computed from the difference between the two vectors, and is based on the dynamics of spontaneous synchronization among the coupled oscillators. The concept is that if the vectors have similar values such that the match is high and the differences are small, then the oscillators synchronize in frequency and phase relatively quicker.

FIG. 1 shows a cluster of oscillators 10 that are weakly coupled to each other via an averager 12 to perform template matching. Individual oscillators 10 are either phase- or frequency-perturbed based on corresponding elements in the difference vector 18 between a five element input vector 14 and a five element vector template 16. The degree-of-match is read out by integrating the oscillation at the averager 12. A person skilled in the art will appreciate that an M dimensional input vector would require a cluster of M oscillators.

Depending on the oscillator behavior, for example as described in References [7] and [8] for a CMOS relaxation oscillator, and coupling architecture, which may be a ring as described in Reference [2], the output DoM measure has been shown to roughly correlate with some $L^p$ norm of the distance between the vectors.

A person skilled in the art understands the formula for an $L^p$ norm, and knows that the formula for an $L^2$ norm of a vector x is $$|x| = \sqrt{\sum_{k=1}^{n} |x_k|^2} ..$$

while the formula for an $L^1$ norm is $$|x|_1 = \sum_{r=1}^{n} |x_r| ..$$

It has been challenging to characterize the DoM measure with a closed-form analytic function of an $L^p$ norm that is differentiable everywhere. Being able to perform such a characterization of DoM is critical because the prior art pattern recognition and machine learning algorithms, which may for example use convolutional nets, or a hierarchy of auto-encoders, are trained using variants of gradient descent, which may for example be delta rule and back-propagation. Delta rule and back-propagation work only for differentiable activation functions for each of the vast number of units in the network. For this reason, existing attempts at exploiting the concept of oscillator clusters to build complex visual object recognition systems have achieved only limited success, as described in References [3] and [4], below, which are incorporated herein by reference. However, methods that use oscillator clusters but which do not depend on gradient descent training have been more successful, as described in References [7] and [8].

REFERENCES

The following references are incorporated by reference.
[1] J. Cruz-Albrecht and N. Srinivasa, U.S. patent application Ser. No. 14/202,200, titled "A Time Encoded Based Network for Image Processing" filed Mar. 10, 2014.
[2] T. Shibata, R. Zhang, S. P. Levitan, D. Nikonov and G. Bourianoff, "CMOS Supporting Circuitries for Nano-Oscillator-Based Associative Memories," *Proc. Intl. Workshop on Cellular Nanoscale Networks and their Applications*, 2012.
[3] S. P. Levitan, Y. Fang, D. H. Dash, T. Shibata, D. E. Nikonov and G. I. Bourianoff, "Non-Boolean Associative Architectures Based on Nano-Oscillators," *Proc. Intl. Workshop on Cellular Nanoscale Networks and their Applications*, 2012.
[4] Levitan, S. P., Fang, Y., Carpenter, J. A., Gnegy, C. N., Janosik, N. S., Awosika-Olumo, S., . . . & Porod, W. (2013). Associative processing with coupled oscillators. In *ISLPED* (p. 235).
[5] Sermanet, P., Eigen, D., Zhang, X., Mathieu, M., Fergus, R., & LeCun, Y. (2014). Overfeat: Integrated recognition, localization and detection using convolutional networks. In *International Conference on Learning Representations (ICLR 2014)*, April 2014.
[6] Krizhevsky, A., Sutskever, I., & Hinton, G. E. (2012). ImageNet classification with deep convolutional neural networks. In *Advances in neural information processing systems* (pp. 1097-1105).
[7] Modeling oscillator arrays for video analytic applications IEEE/ACM International Conference on Computer-Aided Design (ICCAD) DOI:10.1109/ICCAD.2014.7001336, 2014, pages 86-91.
[8] HMAX Image Processing Pipeline with Coupled Oscillator Acceleration 2014 IEEE Workshop on Signal Processing Systems (SiPS) DOI: 10.1109/SiPS.2014.6986101, October 2014, pages 1, 6, and 20-22.
[9] A Computational Primitive for Convolution Based on Coupled Oscillator Arrays International Symposium on Very Large Scale Integration (ISVLSI 2015), Paper No. 144, Montpellier, France, Jul. 8-10, 2015.

What is needed is an improved method to compute inner products, dot products, and convolutions using a cluster of weakly coupled oscillators. The embodiments of the present disclosure answer these and other needs.

SUMMARY

The convolution of two vectors is essentially the dot product between the two vectors. Computing the dot product between two vectors is computationally costly. Each pair of elements M must be multiplied and then summed. When a large number of data points are involved this straight forward computation becomes too costly and a faster, computationally cheaper method is needed. One such method is to compute an approximate dot product of two vectors from the Degree of Match (DoM) between the two vectors and the DoM between each vector and the zero vector. A cluster of weakly coupled oscillators is a computationally inexpensive way to compute the DoM between two vectors. One cluster is used for a first vector and a second, a second cluster is used for the DoM between the first vector and the zero vector, and a third cluster is used to compute the DoM between the second vector and the zero vector. Each DoM is used to enter a precomputed piecewise continuous and differentiable function to produce an estimate of the magnitude squared of the difference between the two vectors. Then the approximate dot product computation is a straight forward combination of the three estimates of the square of the magnitude as described below.

In a first embodiment disclosed herein, a method to perform convolutions between arbitrary vectors comprises estimating a first degree of match for a difference between a first vector having a plurality of first elements and a second vector having a plurality of second elements using a first cluster of weakly coupled oscillators, estimating a second degree of match for the first vector using a second cluster of weakly coupled oscillators, estimating a third degree of match for the second vector using a third cluster of weakly coupled oscillators, deriving a first squared $L^2$ norm (the square of the magnitude of the difference between the first vector and the second vector) from the first degree of match, deriving a second squared $L^2$ norm from the second degree of match, deriving a third squared $L^2$ norm from the third degree of match, adding the second squared $L^2$ norm and the third squared $L^2$ norm, and subtracting the first squared $L^2$ norm to form a sum, and dividing the sum by two. The end result is an estimate of the convolution (dot product) between the first vector and the second vector.

In another embodiment disclosed herein, a method to perform convolutions between arbitrary vectors $\vec{X}$ and $\vec{T}$ comprises calculating the formula $$\vec{X}\cdot\vec{T}=\tfrac{1}{2}\{\|\vec{X}'-\vec{0}\|^2+\|\vec{T}'-\vec{0}\|^2-\|\vec{X}'-\vec{T}'\|^2-2\alpha_X\beta_T\|\vec{X}\|_1-2\alpha_T\beta_X\|\vec{T}\|_1-2\beta_X\beta_T\}$$

wherein $\|\vec{X}'-\vec{T}'\|^2$ is derived from a first degree of match for a difference between the vector $\vec{X}'$ and the vector $\vec{T}'$ using a first cluster of weakly coupled oscillators, wherein $\|\vec{X}'-\vec{0}\|^2$ is derived from a second degree of match for a difference between the vector $\vec{X}'$ and a zero vector using a second cluster of weakly coupled oscillators, wherein $\|\vec{T}'-\vec{0}\|^2$ is derived from a third degree of match for a difference between the vector $\vec{T}'$ and a zero vector using a third cluster of weakly coupled oscillators, wherein each element of the vector $\vec{X}$ and the vector $\vec{T}$ is linearly scaled to range between −1 and +1 to form a scaled vector $\vec{X}'$ and to form a scaled vector $\vec{T}'$ ($\vec{X}'=\alpha_X\vec{X}+\beta_X$ and $\vec{T}'=\alpha_T\vec{T}+\beta_T$), wherein is the $L^1$ norm of vector $\vec{X}$, and wherein $\|\vec{T}\|_1$ is the $L^1$ norm of vector $\vec{T}$.

In yet another embodiment disclosed herein, a device to perform convolutions between arbitrary vectors $\vec{X}$ and $\vec{T}$ comprises a processor for calculating the formula $$\vec{X}\cdot\vec{T}=\tfrac{1}{2}\{\|\vec{X}'-\vec{0}\|^2+\|\vec{T}'-\vec{0}\|^2-\|\vec{X}'-\vec{T}'\|^2-2\alpha_X\beta_T\|\vec{X}\|_1-2\alpha_T\beta_X\|\vec{T}\|_1-2\beta_X\beta_T\},$$

a first cluster of weakly coupled oscillators for determining a first degree of match for a difference between the vector $\vec{X}'$ and the vector $\vec{T}'$ to derive $\|\vec{X}'-\vec{T}'\|^2$, a second cluster of weakly coupled oscillators for determining a second degree of match for a difference between the vector $\vec{X}'$ and a zero vector to derive $\|\vec{X}'-\vec{0}\|^2$, a third cluster of weakly coupled oscillators for determining a third degree of match for a difference between the vector $\vec{T}'$ and a zero vector to derive $\|\vec{T}'-\vec{0}\|^2$, wherein each element of the vector $\vec{X}$ and the vector $\vec{T}$ is linearly scaled to range between −1 and +1 to form a scaled vector $\vec{X}'$ and to form a scaled vector $\vec{T}'$, wherein $\|\vec{X}\|_1$ is the $L^1$ norm of vector $\vec{X}$, and wherein $\|\vec{T}\|_1$ is the $L^1$ norm of vector $\vec{T}$.

These and other features and advantages will become further apparent from the detailed description and accompanying figures that follow. In the figures and description, numerals indicate the various features, like numerals referring to like features throughout both the drawings and the description.

DETAILED DESCRIPTION

Figure 1:
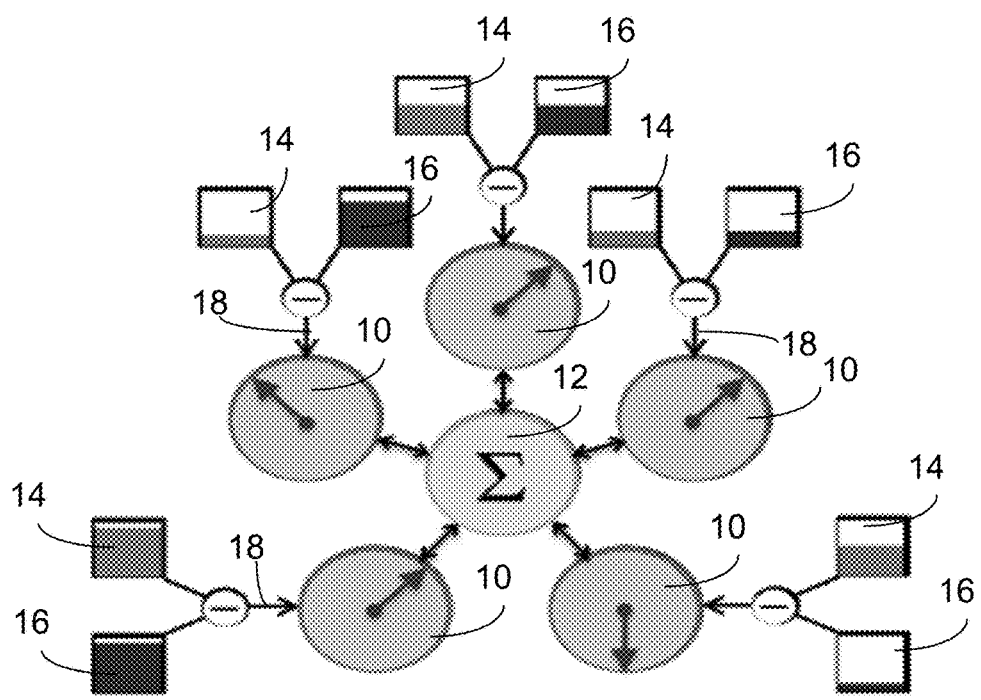
FIG. 1 shows a cluster of oscillators that are weakly coupled via an averager in accordance with the present disclosure.

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The present disclosure describes an analog method to compute inner products, and thereby convolutions, using a cluster of weakly coupled oscillators. The oscillators may be nanoscale oscillator devices, such as resonant body oscillators (RBOs) and spin torque oscillators (STDs). The method of the present disclosure would require $10^4$ less power consumption than that needed for conventional Boolean arithmetic-based convolution. Also, the processing speed of the method of the present disclosure would be $10^3$ times faster than computing convolutions using conventional Boolean arithmetic. Therefore, a large improvement with respect to size, weight, area, and power (SWAP) is possible.

The present disclosure is a method to approximate the computation of a dot product, for which closed-form optimal weight update equations exist for training deep learning networks. For instance, in convolution nets, as described in References [5] and [6], which are incorporated herein by reference, the activity of each unit in the feature matching layers is governed by a sigmoidal signal function that operates on the dot product between its fan-in weight template vector and the inputs in its immediate receptive field. The present disclosure relies on approximating an $L^2$ norm as a function of an DoM with piecewise linear functions, where the number of segments in the piecewise linear function is a variable that improves performance monotonically, as further described below.

Given two high-dimensional vectors $\vec{X}$ and $\vec{T}$ with arbitrary ranges of values, the method of the present disclosure can provide a fast computation of the inner product of the two vectors $\vec{X} \cdot \vec{T}$ based on the following Equation (1)

$$\|\vec{X}-\vec{T}\|^2 = \|\vec{X}\|^2 + \|\vec{T}\|^2 - 2(\vec{X},\vec{T}) \text{ which can be rearranged as Equation (2),}$$

$$\vec{X}\cdot\vec{T} = \tfrac{1}{2}\{\|\vec{X}\|^2 + \|\vec{T}\|^2 - \|\vec{X}-\vec{T}\|^2\} \text{ which is equivalent to Equation (3)}$$

$$\vec{X}\cdot\vec{T} = \tfrac{1}{2}\{\|\vec{X}-\vec{0}\|^2 + \|\vec{T}-\vec{0}\|^2 - \|\vec{X}-\vec{T}\|^2\} \qquad (3).$$

The method of the present disclosure extracts estimates for the required squared $L^2$ norms, namely the squared $L^2$ norms $\|\vec{X}-\vec{0}\|^2$, $\|\vec{T}-\vec{0}\|^2$, and $\|\vec{X}-\vec{T}\|^2$ from the DoM outputs of the oscillator clusters for the corresponding three pairs of vectors, namely, $(\vec{X},\vec{0})$, $(\vec{T},\vec{0})$, and $(\vec{X},\vec{T})$, respectively. As a person skilled in the art would understand that a given value of an $L^2$ norm, for example $\|\vec{X}-\vec{T}\|^2$, may be the result of different pairs of $\vec{X}$ and $\vec{T}$, which is exacerbated for high dimensional vectors.

The method of the present disclosure is applicable to any oscillator cluster technology that computes DoM between two vectors using the physics of spontaneous synchronization.

Figure 2:
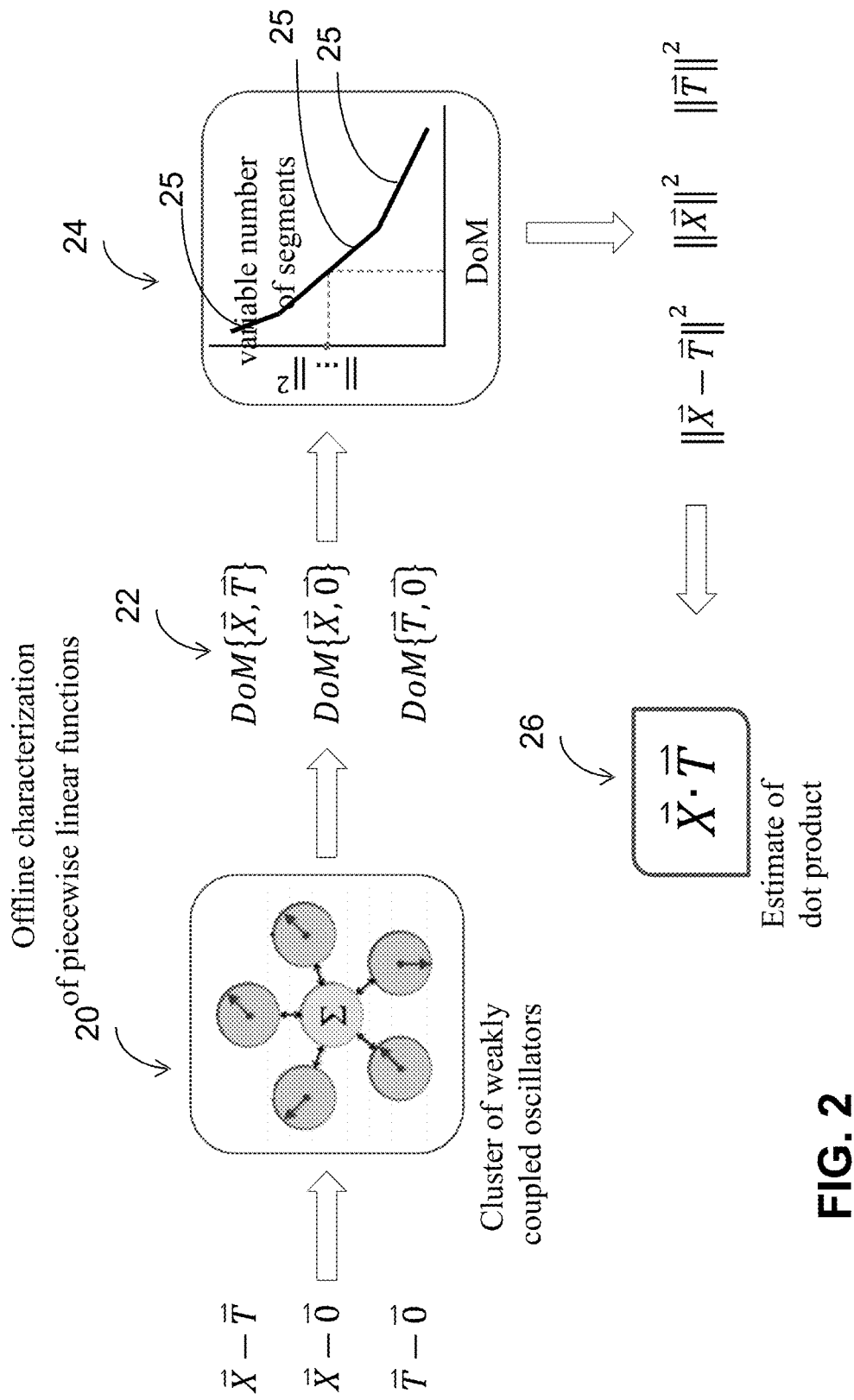
FIG. 2 shows a schematic of a method to estimate dot products using a cluster of weakly coupled oscillators in accordance with the present disclosure.

The method, as shown in FIG. 2, may be performed with an offline procedure to compute the squared $L^2$ norms as a function of the DoM and an online operation mode to compute the dot product of X and T.

Figure 4:
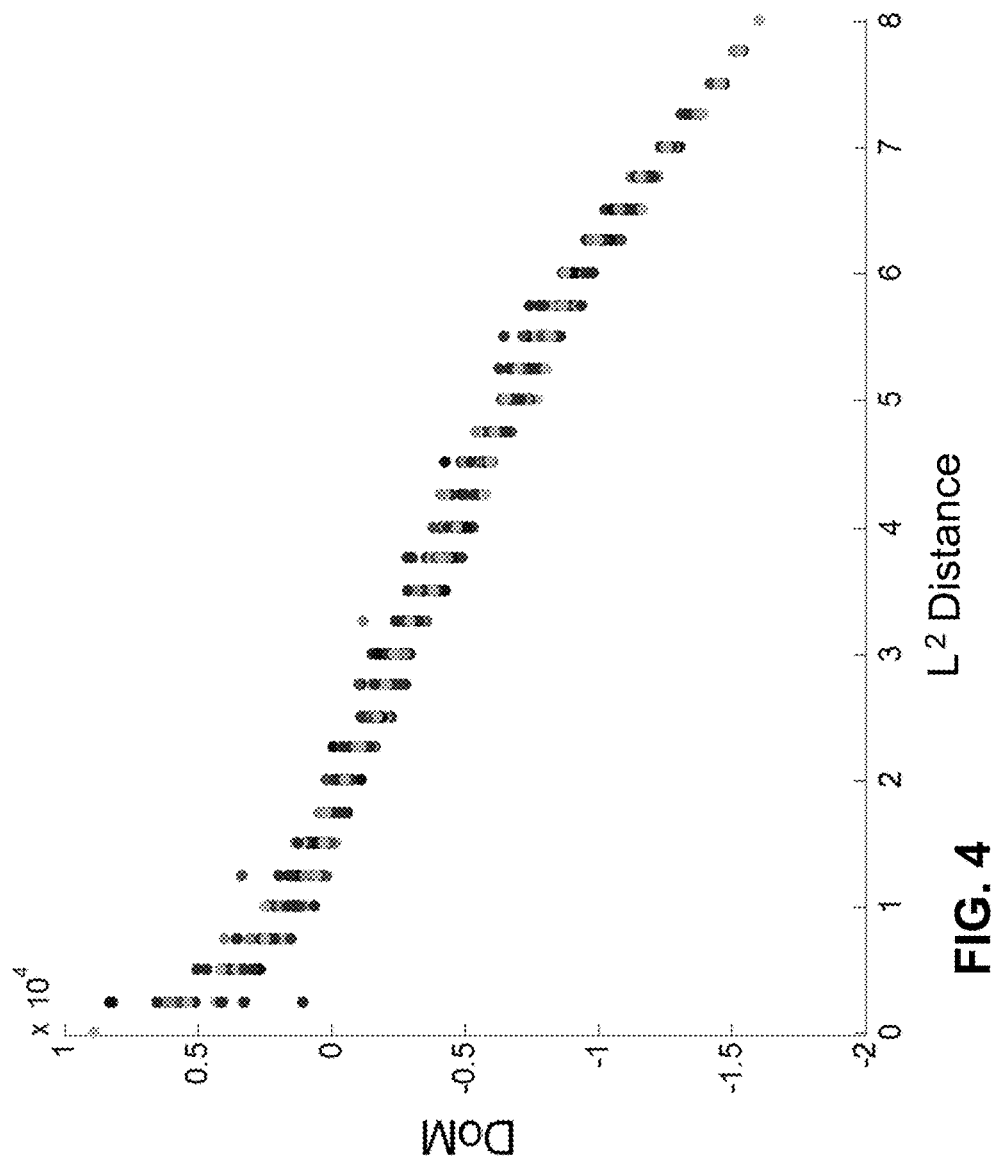
FIG. 4 shows a graph of the degree-of-match (DoM) values of the cluster of time-encoded oscillators of FIG. 3 for various $L^2$ norms of difference vectors in accordance with the present disclosure.
Figure 5:
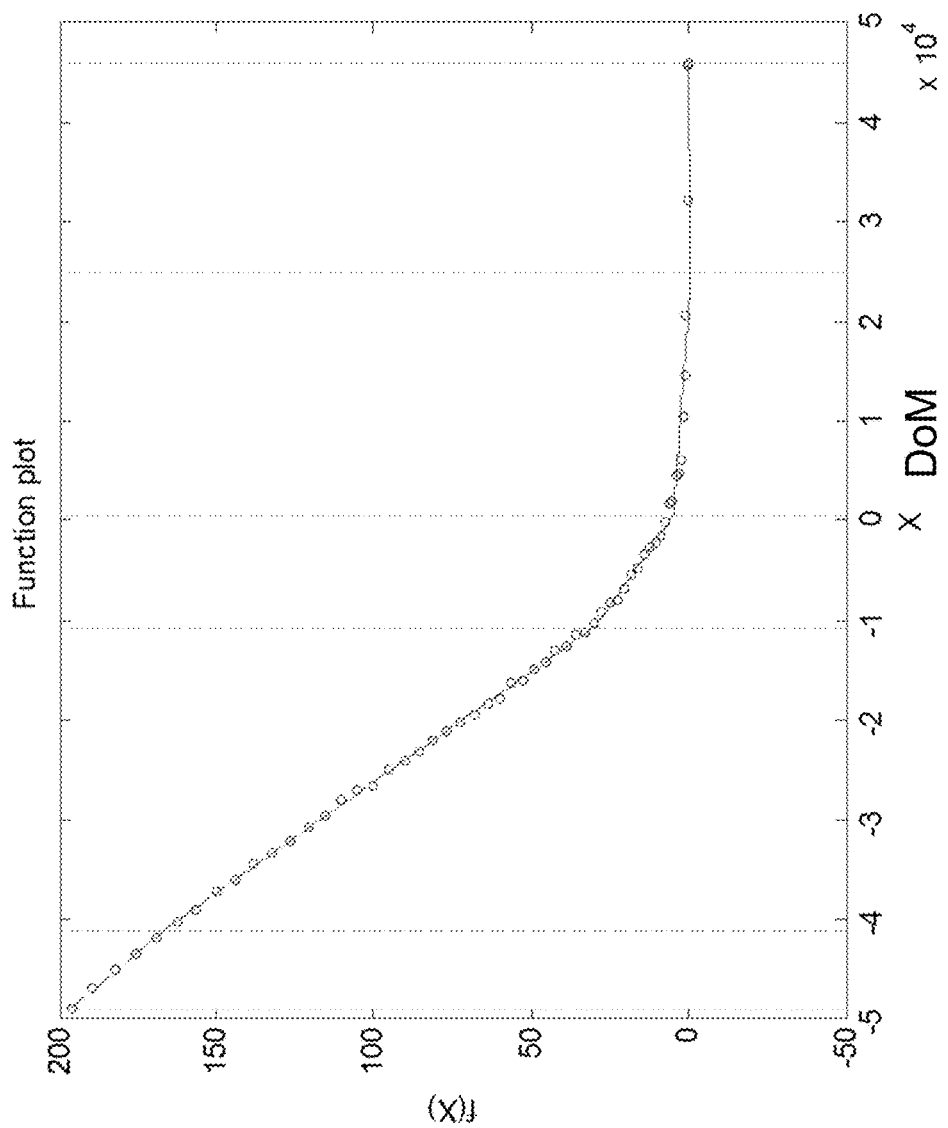
FIG. 5 shows a best-fitting piecewise linear function with five (5) segments for the data of the squared $L^2$ norm on the Y-axis and the DoM on the X-axis in accordance with the present disclosure.

In the offline procedure, a cluster of weakly coupled oscillators, such as the cluster of weakly coupled oscillators 20, shown in FIG. 2 or 32 in FIG. 3, may be used to generate the DoM outputs 22 for the squared $L^2$ norms $\|\vec{X}-\vec{0}\|^2$, $\|\vec{T}-\vec{0}\|^2$, and $\|\vec{X}-\vec{T}\|^2$ for different difference vectors $(\vec{X},\vec{0})$, $(\vec{T},\vec{0})$ and $(\vec{X},\vec{T})$, respectively. The 0 vectors have a 0 value for each element. Each output sample 22 of each squared $L^2$ norm spans a variety of difference vectors. Since X and T are known in this calibration procedure, the squared $L^2$ norm may also be computed offline. This provides a mapping between the DoM and the squared $L^2$ norm an example of which is shown in FIG. 4. Next a piecewise continuous function is derived to provide an optimal estimate of the squared $L^2$ norm from the DoM input. An example of this function is shown in FIG. 5.

In the method, in order to characterize the DoM outputs 22 for different squared $L^2$ norms, it is assumed, without loss of generality as further described below, that the minimum and maximum value for each element in each vector $\vec{X}$ and $\vec{T}$, ranges between −1 and +1. This ensures that the each squared $L^2$ norm ranges from 0 to 4N, where N is the dimensionality of the vectors. For the purpose of characterizing the DoM outputs 22 for the squared $L^2$ norms $\|\vec{X}-\vec{0}\|^2$, $\|\vec{T}-\vec{0}\|^2$, and $\|\vec{X}-\vec{T}\|^2$, this range of −1 and +1 for each vector $\vec{X}$ and $\vec{T}$ preferably is sampled uniformly across the range.

Once the DoM outputs 22 across the range of −1 and +1 for each vector $\vec{X}$ and $\vec{T}$, a graph 24, as shown in FIG. 2, may be constructed for each squared $L^2$ norm $\|\vec{X}-\vec{0}\|^2$, $\|\vec{T}-\vec{0}\|^2$, and $\|\vec{X}-\vec{T}\|^2$, with the squared $L^2$ norm on the Y-axis and the DoM on the X-axis. The next step is to find a best fit using the points in each graph 24 for this relationship using a specified number of piecewise linear segments 25 with flexible breakpoints. This step can be achieved using any of a number of optimization techniques well known to those skilled in the art (e.g., spline interpolation, shape-preserving interpolation, polynomial curve fitting). The graphs 24 or the piecewise linear functions or segments can be stored in one or more memories 24, which can be accessed by a processor 26 to estimate the squared $L^2$ norms $\|\vec{X}-\vec{0}\|^2$, $\|\vec{T}-\vec{0}\|^2$, and $\|\vec{X}-\vec{T}\|^2$ given a respective degree of match (DoM). The relationship in graph 24 may also be stored in a lookup table in memory.

By performing the above steps in an offline procedure, the graph 24 with piecewise linear segments 25 may be used to lookup, or immediately estimate, a squared $L^2$ norm for a DoM generated by the cluster of weakly coupled oscillators.

If vectors $\vec{X}$ and $\vec{T}$ have arbitrary valued-elements, rather than elements ranging from −1 to +1, the vectors may be linearly scaled and shifted to the range of −1 to 1. This can be trivially achieved based on the minimum and maximum values across the elements for each vector. The linear transformation functions are as follows:

$$\vec{X}' = \alpha_X \vec{X} + \beta_X \qquad (4) \text{ and}$$

$$\vec{T}' = \alpha_T \vec{T} + \beta_T \qquad (5).$$

Combining Equations (3)-(5), the following Equation (6) can be derived:

$$\vec{X}\cdot\vec{T} = \tfrac{1}{2}\{\|\vec{X}'-\vec{0}\|^2 + \|\vec{T}'-\vec{0}\|^2 - \|\vec{X}'-\vec{T}'\|^2 - 2\alpha_X\beta_T\|\vec{X}\|_1 - 2\alpha_T\beta_X\|\vec{T}\|_1 - 2\beta_X\beta_T\} \quad (6).$$

Equation (6), above, shows that the dot product 26 can be estimated using the concept of coupled oscillators wherein the first three terms of Equation (6) are three squared $L^2$ norms. These squared $L^2$ norms are derived by using the cluster of weakly coupled oscillators 20 to compute a DoM 22 for each of the first three terms in Equation (6), as shown in FIG. 2. Each DoM is then used to obtain a corresponding squared $L^2$ norm using the piecewise linear functions in the corresponding graph 24.

Equation (6) also requires computing the $L^1$ norms of the two vectors (i.e., $\|\vec{X}\|_1$ and $\|\vec{T}\|_1$), which are relatively less expensive computationally compared to multiplication, because the $L^1$ norm of a vector, as discussed above, is merely the sum of the absolute values of the elements in the vector.

The computations of Equation (6) may be performed by any processor, computer, or microprocessor having storage and computing elements whether digital or analog.

The generation of the DoM outputs 22 for the different squared $L^2$ norms $\|\vec{X}-\vec{0}\|^2$, $\|\vec{T}-\vec{0}\|^2$, and $\|\vec{X}-\vec{T}\|^2$ may be implemented in two ways, serially and in parallel. In the first implementation the same cluster of weakly coupled oscillators 24 are used to perform the characterization of the required squared $L^2$ norms in sequence. In the second implementation three clusters of weakly coupled oscillators are used in parallel for the characterization of the three squared $L^2$ norms.

Figure 3A:
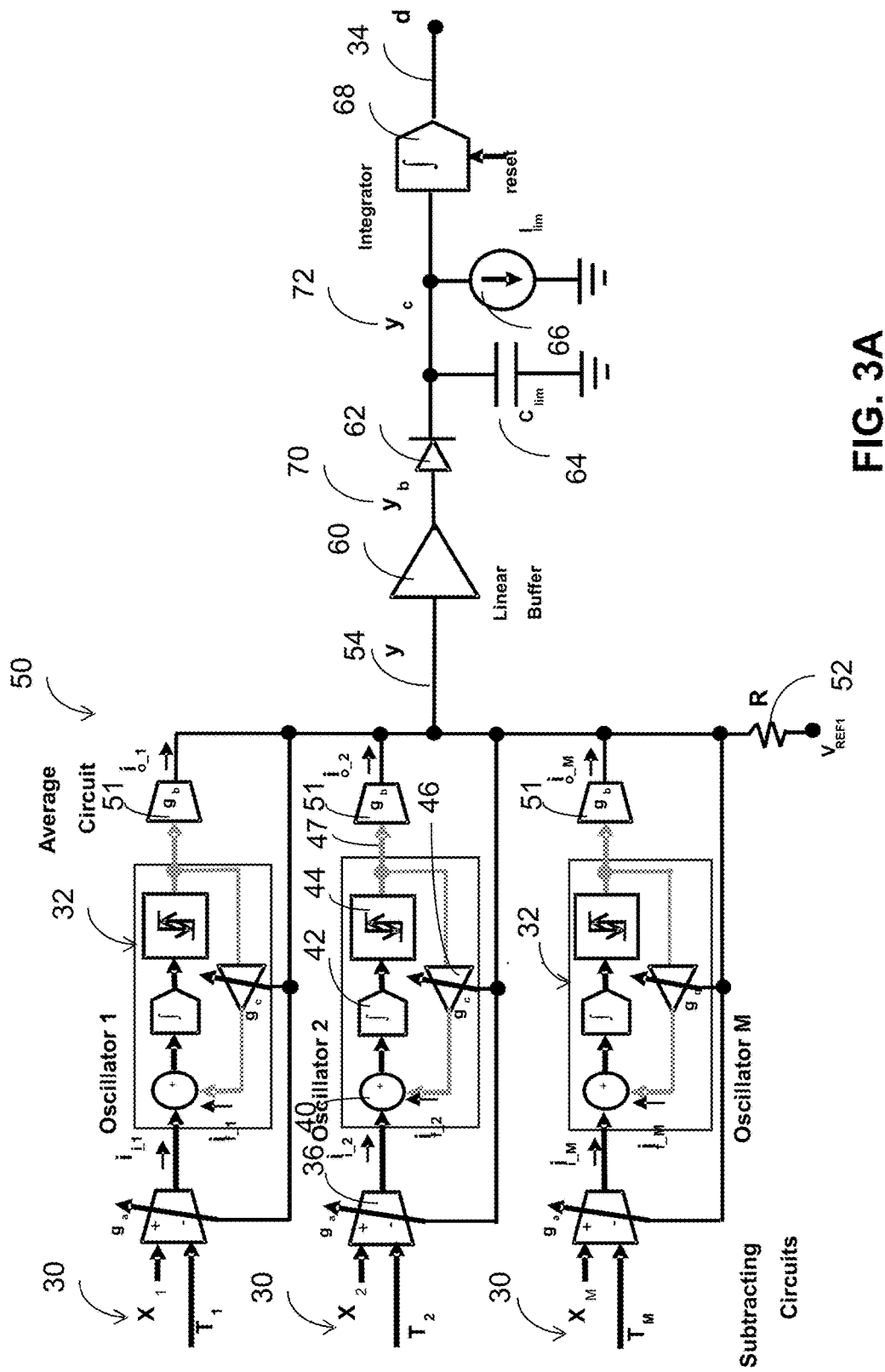
FIGS. 3A and 3B show circuits with M time-encoded oscillators to calculate the degree of match between an input vector $\vec{X}$ and a target vector $\vec{T}$ in accordance with the present disclosure.

FIG. 3A shows an analog circuit for a particular hardware design of time-encoded oscillator clusters, as described in Reference [1], which is U.S. patent application Ser. No. 14/202,200, filed Mar. 10, 2014, and which is incorporated herein by reference. The circuit may be implemented with MS-CMOS. The circuit has an array of M time encoders oscillators 32, one for each of the elements 30 in the input vector $\vec{X}$ and the target vector $\vec{T}$. Each element of these vectors may have an analog value. When $\vec{X}$ and $\vec{T}$ match, the time encoder oscillators 32 are more synchronized. When they do not match, the time encoder oscillators 32 are less synchronized. The amount of synchronization and the degree of match (DoM) between the input vector $\vec{X}$ and the target vector $\vec{T}$ is indicated by the output signal d 34 produced at the output of the circuit.

As shown in FIG. 3A, the input vector $\vec{X}$ and the target vector $\vec{T}$ are input to a set of subtracting circuits 30, one subtracting element 30 for each element in the vectors. The subtracting circuits may be transconductance amplifier cells 36 having a variable gain. Each transconductance amplifier cell 36 has a voltage input for an element of the input vector $\vec{X}$, a voltage input for an element of the target vector $\vec{T}$, and one current output. The array of oscillators 32 may be based on time encoders. Each time encoder is composed of a summer 40, an integrator 42, a hysteresis quantizer 44, and a current feedback from a 1-bit DAC 46 with variable gain.

The integrators 42 may be implemented with capacitors, and the hysteresis quantizers 44 and the 1-bit DACs 46 may be implemented with CMOS transistors. The output 48 of the time encoder is an asynchronous pulse-type signal that has only two possible values: high and low. This type of oscillator, with only two binary amplitude values, can be implemented efficiently in CMOS technology with low voltage swings.

The output 47 of each time encoder is an input to an averager circuit 50, which includes transconductance amplifiers 51 each connected to resistor 52. The resistor 52 may be connected to a reference voltage $V_{REF1}$. The transconductance amplifiers 51 convert the voltage outputs 47 of the time encoder oscillators 32 into currents. The currents of all the transconductance amplifiers 51 may be summed together by wire merging and are connected to resistor 52 to form the oscillatory signal y 54.

Then a match circuit is used to convert the oscillatory signal y 54 into the output signal d 34 that has a higher voltage when $\vec{X}$ is close to $\vec{T}$ and a lower voltage when $\vec{X}$ is not close to $\vec{T}$. The match circuit includes a buffer 60, a diode 62, a capacitor 64, a current source circuit 66, and an integrator 68. The buffer 60 is used to produce a voltage signal $y_b$ 70 with the same voltage value as the signal y 54 produced by the averager circuit 50. The buffer 60 is used to ensure that the current flowing through the diode 62 does not have any effect on the output voltage signal y 54 of the averager circuit 50. The diode 62, capacitor 64, and current source circuit 66 are used to rectify the signal $y_b$ 70 The result of the rectification is a voltage signal $y_c$ 72 that follows the peak values of the oscillatory signal $y_b$ 70. The integrator 68 is used to integrate $y_c$ 72. The integrator 68 can be reset by a reset signal 74. The output of the integrator is voltage signal d 34. The voltage of this signal d 34, measured at a certain fixed time period after the reset signal 74 is enabled, represents the degree of match (DoM) between the input $\vec{X}$ and the target $\vec{T}$ vectors. The time period to measure the signal d 34 can be in the order of fifty (50) times larger than a typical average oscillation cycle time of the oscillators 32.

For the circuit of FIG. 3A the feedback signal 54 to each oscillator is typically ~36% of the signal that would be generated by doing the arithmetic average of all the oscillators outputs 47. This feedback 54 is used to weakly couple oscillators 32. The feedback 54 is controlled by adjusting the value of R 52 compared to the value of gb in the sub-circuit 51 labelled as "Average Circuit", which may perform averaging and attenuation.

In some embodiments the feedback signal 54 is between 1% and 36% of the arithmetic average of all oscillator outputs 47. Another range for the value of the feedback signal is 0.04 to 0.50 of the arithmetic average of the outputs 47 of the oscillators 32. A typical feedback signal may be 0.36*(Output_of_Oscillator_1+Output_of_Oscillator_2+ . . . +Output_of_Oscillator_M)/M. The number of oscillators M is arbitrary. In FIG. 3A, three oscillators 32 are shown. In another embodiment the number of oscillators may be nine.

Figure 3B:
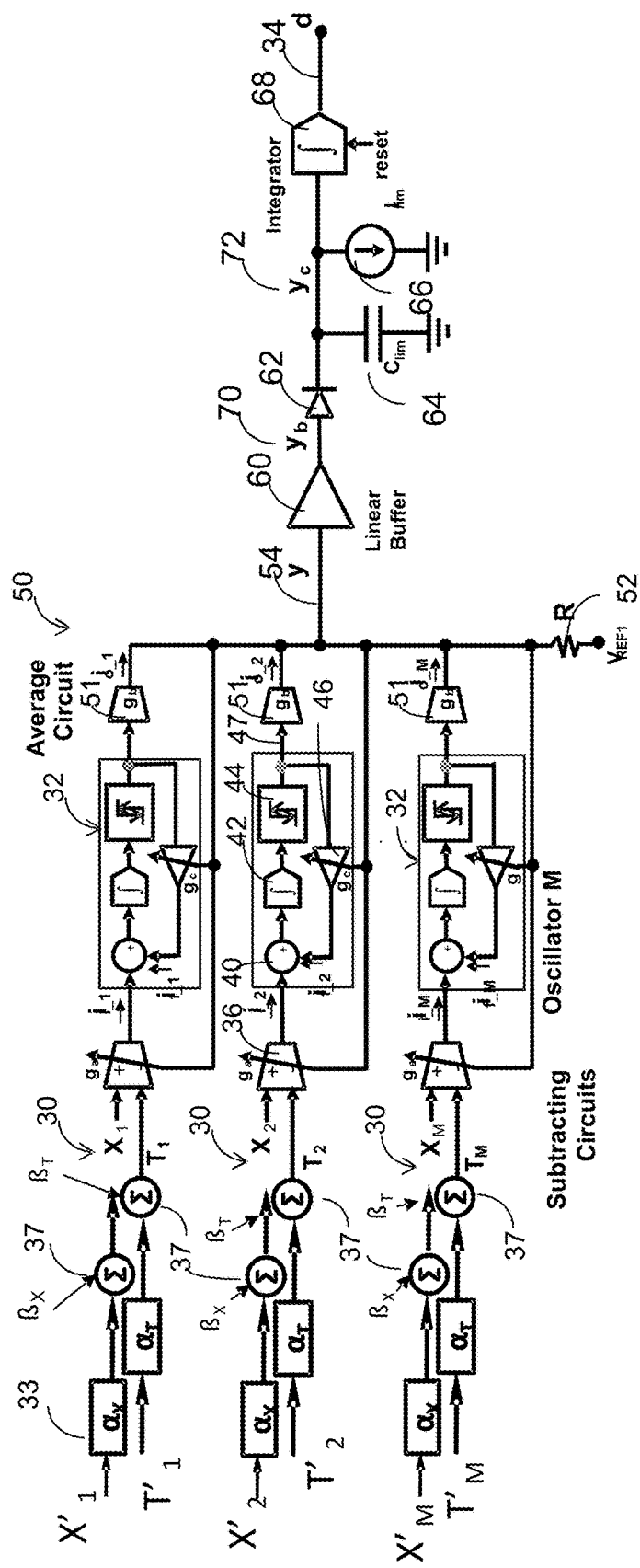

The circuit of FIG. 3B is similar to that of the circuit of FIG. 3A with the addition of circuitry to normalize the range of the elements of X' and T' by the scale factors 33 and biases 37 to between −1 and +1 as shown in equations 4 and 5.

The coupled oscillator cluster of FIG. 3A has been simulated to estimate dot products. FIG. 4 shows a graph of the degree-of-match (DoM) values for the time-encoded oscillator cluster of FIG. 3A for difference vectors with dimensionality of 16, and with vector elements values that range between −1 and 1. Note that FIG. 4 plots the DoM versus the L2 distance, not the square of the L2 distance. Each squared $L^2$ distance corresponds to various sets of input vectors $\vec{X}$ and $\vec{T}$.

FIG. 5 is a graph showing a best-fitting piecewise linear function with five (5) piecewise linear segments with the squared $L^2$ distance on the Y-axis and the DoM on the X-axis for difference vectors with dimensionality of 49 and whose elements have values between −1 and 1.

Figure 6:
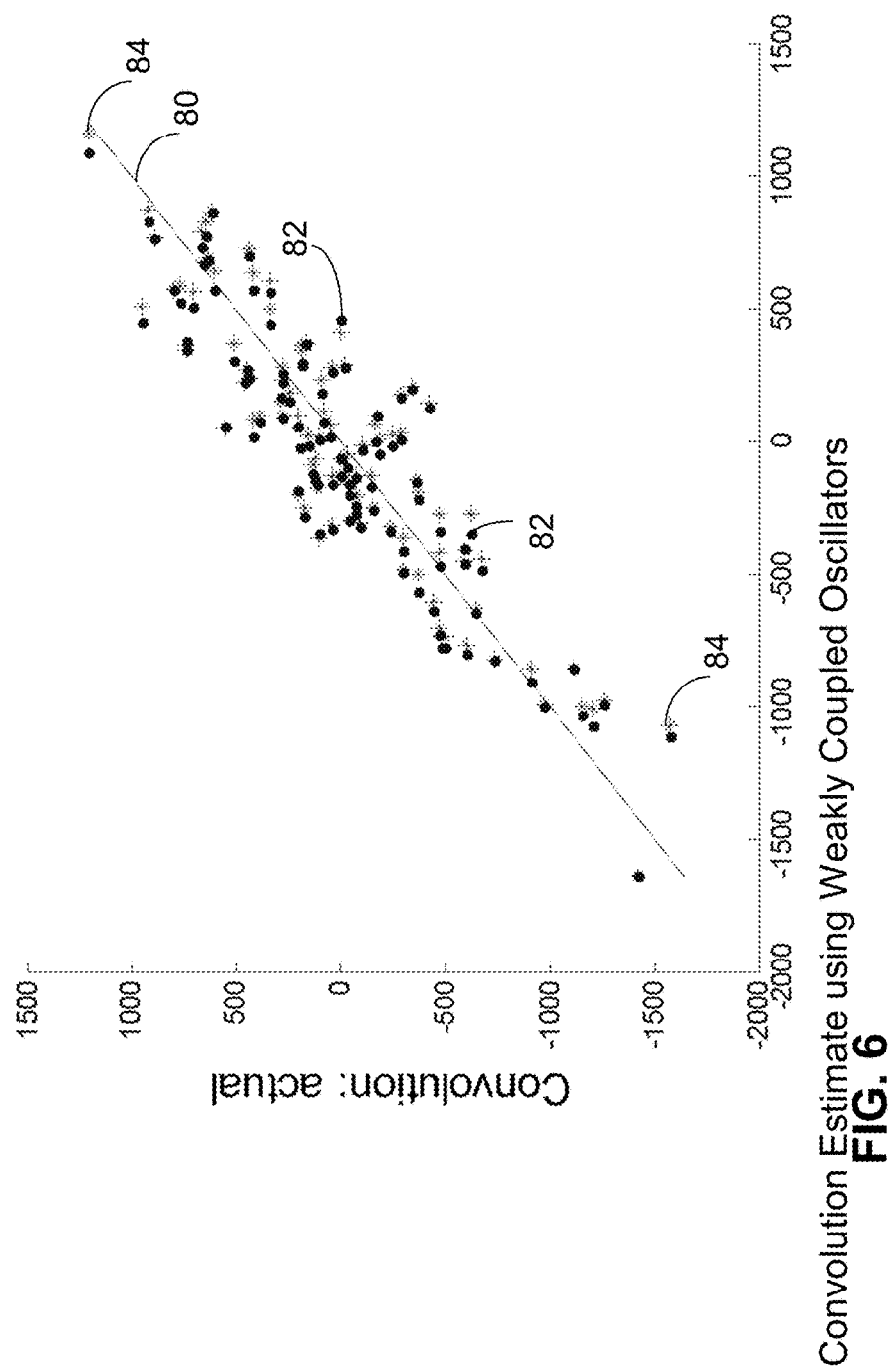
FIG. 6 shows a correlation for various instances of an actual dot product and a corresponding value estimated in accordance with the present disclosure.

FIG. 6 shows that there is a high correlation for various instances of the actual computed dot product 80 and the corresponding value estimated using the method of the present disclosure using the weakly coupled time-encoded oscillator clusters. For the graph of FIG. 6, the vectors have a dimensionality of 16 with the elements of the vector ($\vec{X}$) varying between 0 and 255, while the elements of the vector ($\vec{T}$) vary between −1 and 1. In FIG. 6, Equation (6) was used to estimate the dot products 82 and 84. The dot points 82 and the star points 84 on the graph of FIG. 6 correspond to piecewise linear function approximations with 5 and 10 segments, respectively, for characterizing the relationship between the squared $L^2$ norms and the DoM output. FIG. 6 plots the actual convolution of ($\vec{X}$) and ($\vec{T}$) on the ordinate versus the computed convolution according to the present disclosure on the abscissa. FIG. 6 indicates that using the methods of the present disclosure, the dot products can be estimated with a high level of accuracy. The correlation between the actual computed convolutions and the estimated convolutions using the cluster of weakly coupled time-encoded oscillator for piecewise linear functions with 5 and 10 segments are 0.9021 and 0.9034, respectively, which also indicates that the accuracy improves with the number of segments in the best-fitting piecewise linear function.

Figure 7:
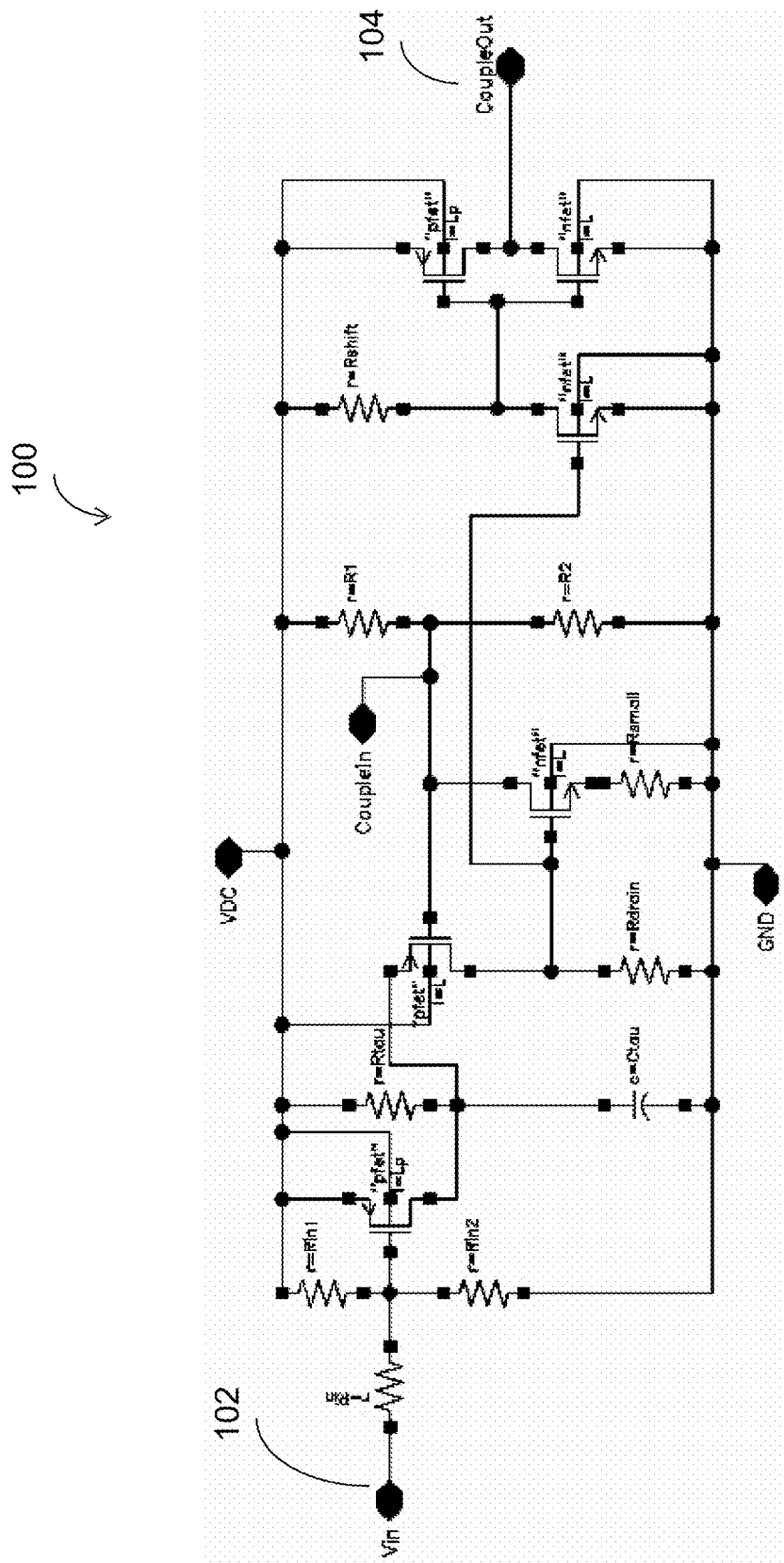
FIG. 7 shows a voltage controlled CMOS relaxation oscillator in accordance with the present disclosure.
Figure 8:
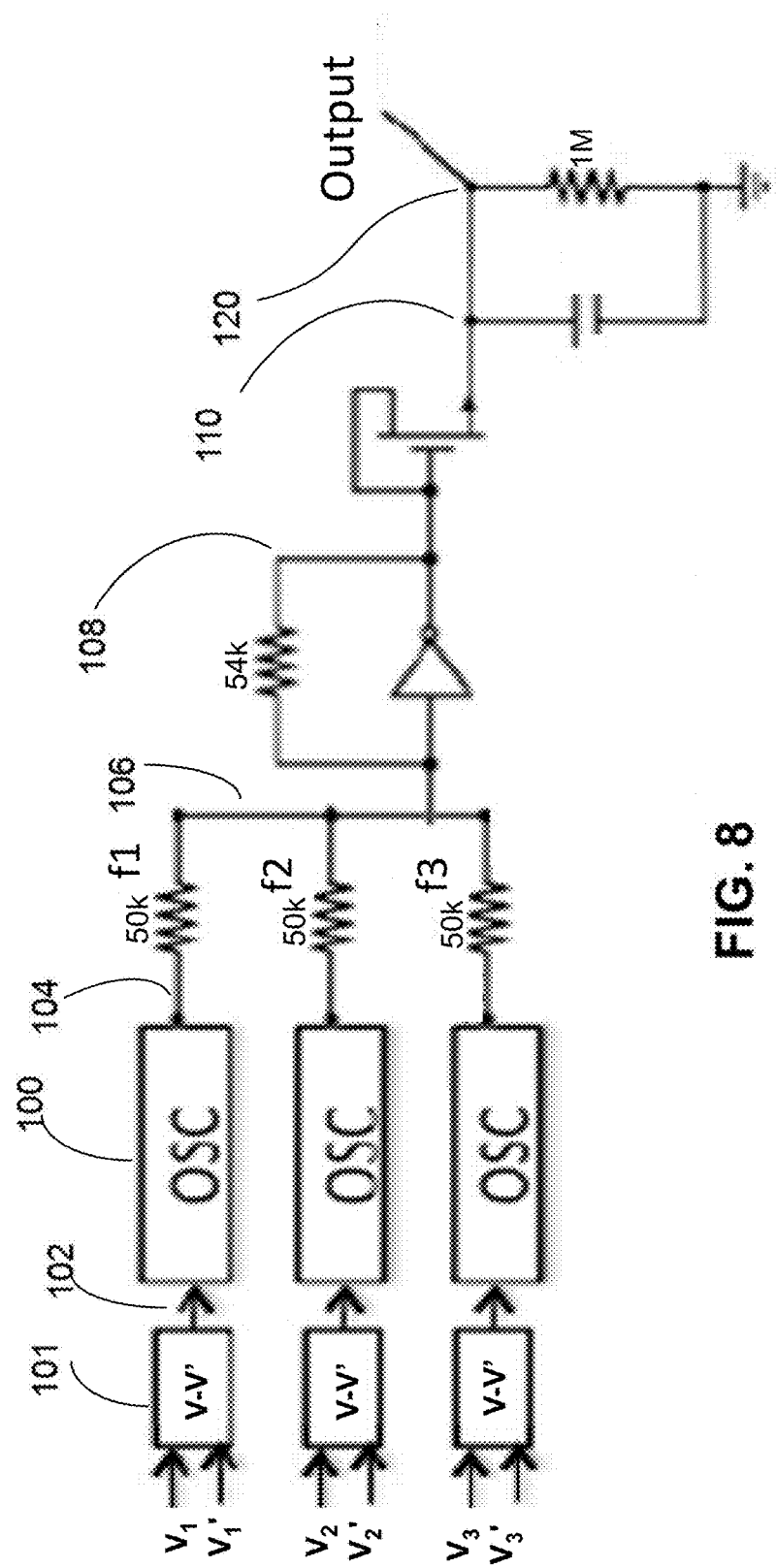
FIG. 8 shows a cluster of coupled oscillators with a buffer and integrator circuit for deriving a degree of match (DOM) in accordance with the present disclosure.

In another embodiment, a simpler coupled oscillator 100, as shown in FIG. 7, may be used in the circuit of FIG. 8, rather than the time encoder oscillators 32 of FIG. 3. The oscillator 100 may be implemented with CMOS circuitry. The oscillator 100 shown in FIG. 7 may be a voltage-controlled CMOS oscillator 100, and may also be a voltage controlled relaxation oscillator. Multiple voltage-controlled CMOS oscillators 100 are connected together as shown in FIG. 8.

The input Vin 102 to each voltage-controlled CMOS oscillator 100 is from analog voltage difference circuit 101 and is an analog voltage difference $(X_i-T_i)$ of elements $X_i$ and $T_i$ of two vectors $\vec{X}$ and $\vec{T}$. The outputs 104 of the voltage-controlled CMOS oscillators 100 may be combined or summed by direct electrical connection at connection 106, and then buffered by buffer 108 and integrated by integrator 110 to form output 120.

Figure 9:
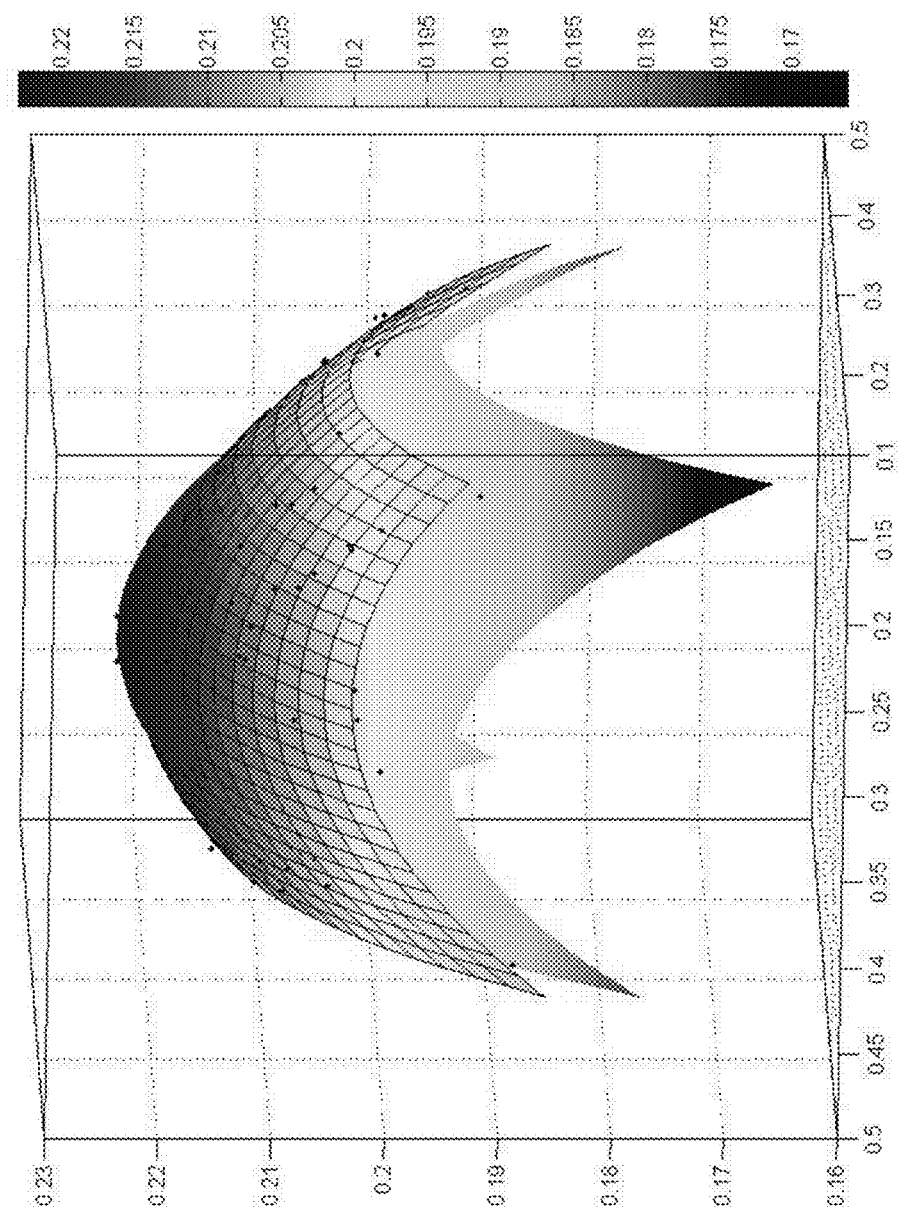
FIG. 9 shows a degree of match (DOM) measured from sampling the integration output of FIG. 8 in accordance with the present disclosure.

When $\vec{X}$ and $\vec{T}$ match, the voltage-controlled CMOS oscillators 100 are more synchronized. When they do not match, the voltage-controlled CMOS oscillators 100 are less synchronized. The output 120 depends on the amount of synchronization and the degree of match (DoM) between the input vector $\vec{X}$ and the target vector $\vec{T}$. The integrated waveform at the output 120, and the sampled voltage of the output 120 has the characteristic of the squared $L^2$ norm, which may be expressed as the $L_2^2$ norm, as shown in FIG. 9. The inverted parabolic shape of FIG. 9 is characteristic of the squared $L^2$ norm for the distance between the two vectors $\vec{X}$ and $\vec{T}$.

The DoM circuit shown in FIG. 8 behaves as a distance metric that can be modeled as the Euclidean distance squared ($L_2^2$) between two vectors A and B as shown in Equation 7.

$$DOM(A, B) = L_2^2(A, B) \qquad (7)$$

$$= \sum_{i=1}^{n} (a_i | -b_i)^2$$

Therefore, vector convolution may be implemented with oscillators by making a simple algebraic transformation of Equation (7). By expanding and rearranging this equation, an expression for the convolution of A and B in terms of three oscillator-based DOM circuits can be derived, as shown in Equation 8.

$$DOM(A, B) = (A - B)^2 \qquad (8)$$
$$= A^2 - 2AB - B^2$$
$$\frac{(A - B)^2 - A^2 - B^2}{-2} = AB$$
$$\frac{DOM(A, B) - DOM(A, 0) - DOM(B, 0)}{-2} = AB$$

Equation (8) shows that the dot product or convolution of two vectors A and B can be computed by using three oscillator clusters, each computing a DoM. One oscillator cluster computes the DoM between vector A and B, DOM (A,B), the second oscillator cluster computes the DOM between the vector A and a zero vector, DOM(A,0), and the third oscillator cluster computes the DOM between the vector B and a zero vector, DOM(B,0). Then a simple subtractor and scale operator can be used to produce the dot product of vector A and vector B, as shown in Equation (8). The quality of the derived dot product, or a measure of how close it matches the mathematical ideal, is a function of the oscillators, the coupling, the DOM circuitry, and how close the sampled response is to the $L_2^2$ norm.

For the circuit described above with reference to FIGS. 7 and 8, the difference in fitting functions between the derived dot product using the circuit of FIG. 8 and the mathematical ideal has been measured in one embodiment to have an RMS error of 0.0069. Simulations of coupled spin-torque oscillators (STOs) have shown the same $L_2^2$ norm. This shows that a wide range of coupled oscillator systems implemented in a wide variety of technologies may be used.

The present disclosure has described methods and apparatus to compute inner products, and thereby convolutions, between arbitrary vectors. Any oscillator cluster technology that computes a degree-of-match between two vectors using spontaneous synchronization dynamics may be used, including those described in FIGS. 3A, 3B, 7 and 8, and also nano-scale oscillator devices such as resonant body oscillators and spin torque oscillators. The methods and apparatus provide energy efficient and high throughput convolutions.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A method to perform convolutions between arbitrary vectors comprising:
   computing a first degree of match for a difference between a first vector having a plurality of first elements and a second vector having a plurality of second elements using a first cluster of weakly coupled oscillators;
   computing a second degree of match for the first vector using a second cluster of weakly coupled oscillators;
   computing a third degree of match for the second vector using a third cluster of weakly coupled oscillators;
   estimating a first squared $L^2$ norm from the first degree of match;
   estimating a second squared $L^2$ norm from the second degree of match;
   estimating a third squared $L^2$ norm from the third degree of match; and
   adding the second squared $L^2$ norm and the third squared $L^2$ norm, and subtracting the first squared $L^2$ norm to form a sum.

2. The method of claim 1 wherein:
   estimating the first squared $L^2$ norm from the first degree of match comprises using a first precomputed lookup table or a first precomputed piecewise linear function for deriving the first squared $L^2$ norm from the first degree of match;
   estimating the second squared $L^2$ norm from the second degree of match comprises using a second precomputed lookup table or a second precomputed piecewise linear function for deriving the second squared $L^2$ norm from the second degree of match; and
   estimating the third squared $L^2$ norm from the third degree of match comprises using a third precomputed lookup table or a third precomputed piecewise linear function for deriving the third squared $L^2$ norm from the third degree of match.

3. The method of claim 1 wherein:
   estimating the first squared $L^2$ norm from the first degree of match comprises:
      characterizing the first degree of match for different first squared $L^2$ norms using the first cluster of weakly coupled oscillators to estimate a first degree of match for a plurality of samples of elements of the first vector and for a plurality of samples of elements of the second vector to form a correspondence between a respective first degree of match and a respective first squared $L^2$ norm, wherein each element of the first vector and each element of the second vector ranges between −1 and +1;
   estimating the second squared $L^2$ norm from the second degree of match comprises:
      characterizing the second degree of match for different second squared $L^2$ norms using the second cluster of weakly coupled oscillators to estimate a second degree of match for a plurality of samples of elements of the first vector to form a correspondence between a respective second degree of match and a respective second squared $L^2$ norm, wherein each element of the first vector ranges between −1 and +1; and
   deriving the third squared $L^2$ norm from the third degree of match comprises:
      characterizing the third degree of match for different third squared $L^2$ norms using the third cluster of weakly coupled oscillators to estimate a third degree of match for a plurality of samples of elements of the second vector to form a correspondence between a respective third degree of match and a respective third squared $L^2$ norm, wherein each element of the second vector ranges between −1 and +1.

4. The method of claim 3:
   wherein estimating the first degree of match for the difference between the first vector having a plurality of first elements and the second vector having a plurality of second elements comprises estimating the first degree of match for a difference between the first vector and the second vector, wherein each element of the first vector and each element of the second vector ranges between −1 and +1;
   wherein estimating the second degree of match for the first vector comprises estimating the second degree of match wherein each element of the first vector ranges between −1 and +1; and
   wherein estimating the third degree of match for the second vector comprises estimating the third degree of match wherein each element of the second vector ranges between −1 and +1; and
   further comprising
   calculating a first $L^1$ norm of the first vector;
   calculating a second $L^1$ norm of the second vector;
   adding the second squared $L^2$ norm and the third squared $L^2$ norm, and subtracting the first squared $L^2$ norm, a first scaling factor times the first $L^1$ norm, a second scaling factor times the second $L^2$ norm, and a third factor to form a sum; and
   dividing the sum by two.

5. The method of claim 1:
   wherein the second cluster of weakly coupled oscillators is the first cluster of weakly coupled oscillators; and
   wherein the third cluster of weakly coupled oscillators is the first cluster of weakly coupled oscillators.

6. The method of claim 1 further comprising:
   estimating a plurality of first degree of matches for a plurality of first vectors and a plurality of second vectors over a range of values of the first elements of the first vectors and over a range of values of the second elements of the second vectors to characterize a relationship between a respective first degree of match and a respective first squared $L^2$ norm;

estimating a plurality of second degree of matches for a plurality of first vectors over the range of values of the first elements of the first vectors to characterize a relationship between a respective second degree of match and a respective second squared $L^2$ norm; and estimating a plurality of third degree of matches for a plurality of second vectors over the range of values of the second elements of the second vectors to characterize a relationship between a respective third degree of match and a respective third squared $L^2$ norm.

7. The method of claim 1 wherein:

estimating the second degree of match for the first vector using the second cluster of weakly coupled oscillators comprises estimating a second degree of match for a difference between the first vector and a third vector having a plurality of zero elements; and estimating the third degree of match for the second vector using the third weakly cluster of coupled oscillators comprises estimating the third degree of match for a difference between the second vector and the third vector having the plurality of zero elements.

8. The method of claim 1 wherein:

the first cluster of weakly coupled oscillators comprises a resonant body oscillator or a spin torque oscillator;

the second cluster of weakly coupled oscillators comprises a resonant body oscillator or a spin torque oscillator; and the third cluster of weakly coupled oscillators comprises a resonant body oscillator or a spin torque oscillator.

9. The method of claim 1 wherein:

the first cluster of weakly coupled oscillators comprises:
   a plurality of difference circuits, each respective difference circuit coupled to a respective element of the first vector and to a respective element of the second vector and having a respective difference output;
   a plurality of oscillators, each respective oscillator having a respective input coupled to a respective difference output, and having a respective oscillator output;
   a summer for adding the respective oscillator outputs; and
   an integrator for integrating over a plurality of cycles of the oscillators and having an integrator output for providing an estimate of the first degree of match.

10. The method of claim 9 wherein:

each difference circuit comprises a transconductance amplifier; and each oscillator comprises a time encoded oscillator comprising:
   a summer coupled to the difference circuit;
   an integrator coupled to the summer;
   a hysteresis quantizer coupled to the integrator; and
   a 1-bit digital to analog converter coupled to the hysteresis quantizer having an output coupled to the summer.

11. The method of claim 9 wherein:

each difference circuit comprises an analog voltage difference circuit; and each oscillator comprises:
   a voltage controlled oscillator or a voltage controlled relaxation oscillator.

12. The method of claim 1 wherein:

each of the second and third clusters of weakly coupled oscillators comprises:

a plurality of difference circuits, each respective difference circuits having a respective output;
   a plurality of oscillators, each respective oscillator coupled to a respective output and having a respective oscillator output;
   a summer for adding the respective oscillator outputs; and
   an integrator for integrating over a plurality of cycles of the oscillators and having an integrator output for providing an estimate of a degree of match.

13. A method to perform convolutions between arbitrary vectors $\vec{X}$ and $\vec{T}$ comprising:

calculating the formula $$\vec{X} \cdot \vec{T} = \tfrac{1}{2} \{ \|\vec{X}' - \vec{0}\|^2 + \|\vec{T}' - \vec{0}\|^2 - \|\vec{X}' - \vec{T}'\|^2 - 2\alpha_X \beta_T \| \vec{X}\|_1 - 2\alpha_T \beta_X \|\vec{T}\|_1 - 2\beta_X \beta_T \};$$

wherein $\|\vec{X}' - \vec{T}'\|^2$ is derived from a first degree of match for a difference between the vector $\vec{X}'$ and the vector $\vec{T}'$ using a first cluster of weakly coupled oscillators;

wherein $\|\vec{X}' - \vec{0}\|^2$ is derived from a second degree of match for a difference between the vector $\vec{X}'$ and a zero vector using a second cluster of weakly coupled oscillators;

wherein $\|\vec{T}' - \vec{0}\|^2$ is derived from a third degree of match for a difference between the vector $\vec{T}'$ and a zero vector using a third cluster of weakly coupled oscillators;

wherein each element of the vector $\vec{X}$ and the vector $\vec{T}$ is linearly scaled to range between $-1$ and $+1$ to form a scaled vector $\vec{X}'$ and to form a scaled vector $\vec{T}'$;

wherein $\|\vec{X}\|_1$ is the $L^1$ norm of vector $\vec{X}$; and wherein $\|\vec{T}\|_1$ is the $L^1$ norm of vector $\vec{T}$.

14. The method of claim 13 further comprising:

characterizing the first degree of match for different $\|\vec{X}' - \vec{T}'\|^2$ using the first cluster of weakly coupled oscillators;

characterizing the second degree of match for different $\|\vec{X}' - \vec{0}\|^2$ using the second cluster of weakly coupled oscillators; and characterizing the third degree of match for different $\|\vec{T}' - \vec{0}\|^2$ using the third cluster of weakly coupled oscillators.

15. The method of claim 13:

wherein the second cluster of weakly coupled oscillators is the first cluster of weakly coupled oscillators; and wherein the third cluster of weakly coupled oscillators is the first cluster of coupled oscillators.

16. The method of claim 13 wherein:

the first cluster of weakly coupled oscillators comprises a resonant body oscillator or a spin torque oscillator;

the second cluster of weakly coupled oscillators comprises a resonant body oscillator or a spin torque oscillator; and the third cluster of weakly coupled oscillators comprises a resonant body oscillator or a spin torque oscillator.

17. The method of claim 13 wherein:

the first cluster of weakly coupled oscillators comprises:
   a plurality of difference circuits, each respective difference circuit coupled to a respective element of the scaled vector $\vec{X}'$ and to a respective element of the scaled vector $\vec{T}'$ and having a respective difference output;

a plurality of oscillators, each respective oscillator having a respective input coupled to a respective difference output, and having a respective oscillator output;

a summer for adding the respective oscillator outputs; and an integrator for integrating over a plurality of cycles of the oscillators and having an integrator output for providing an estimate of the first degree of match.

18. The method of claim 17 wherein:

each difference circuit comprises a transconductance amplifier; and each oscillator comprises a time encoded oscillator comprising:
 a summer coupled to the difference circuit;
 an integrator coupled to the summer;
 a hysteresis quantizer coupled to the integrator; and
 a 1-bit digital to analog converter coupled to the hysteresis quantizer having an output coupled to the summer.

19. The method of claim 17 wherein:

each difference circuit comprises an analog voltage difference circuit; and each oscillator comprises:
 a voltage controlled oscillator or a voltage controlled relaxation oscillator.

20. The method of claim 13 wherein:

each of the second and third clusters of weakly coupled oscillators comprises:
 a plurality of difference circuits, each respective difference circuits having a respective output;
 a plurality of oscillators, each respective oscillator coupled to a respective output and having a respective oscillator output;
 a summer for adding the respective oscillator outputs; and
 an integrator for integrating over a plurality of cycles of the oscillators and having an integrator output for providing an estimate of a degree of match.

21. A device to perform convolutions between arbitrary vectors $\vec{X}$ and $\vec{T}$ comprising:

a processor for calculating the formula $$\vec{X} \cdot \vec{T} = \tfrac{1}{2}\{\|\vec{X}'-\vec{0}\|^2 + \|\vec{T}'-\vec{0}\|^2 - \|\vec{X}'-\vec{T}'\|^2 - 2\alpha_X\beta_T\|\vec{X}\|_1 - 2\alpha_T\beta_X\|\vec{T}\|_1 - 2\beta_X\beta_T\};$$

a first cluster of weakly coupled oscillators for determining a first degree of match for a difference between the vector $\vec{X}'$ and the vector $\vec{T}'$ to derive $\|\vec{X}'-\vec{T}'\|^2$;

a second cluster of weakly coupled oscillators for determining a second degree of match for a difference between the vector $\vec{X}'$ and a zero vector to derive $\|\vec{X}'-\vec{0}\|^2$;

a third cluster of weakly coupled oscillators for determining a third degree of match for a difference between the vector $\vec{T}'$ and a zero vector to derive $\|\vec{T}'-\vec{0}\|^2$;

wherein each element of the vector $\vec{X}$ and the vector $\vec{T}$ is scaled linearly by $\alpha_X\beta_X$ and $\alpha_T\beta_T$ respectively to range between $-1$ and $+1$ to form a scaled vector $\vec{X}'$ and to form a scaled vector $\vec{T}'$;

wherein $\|\vec{X}\|_1$ is the $L^1$ norm of vector $\vec{X}$; and wherein $\|\vec{T}\|_1$ is the $L^1$ norm of vector $\vec{T}$.

22. The device of claim 21 further comprising:

a first memory for storing a characterization of the first degree of match for different $\|\vec{X}'-\vec{T}'\|^2$ using the first cluster of weakly coupled oscillators;

a second memory for storing a characterization of the second degree of match for different $\|\vec{X}'-\vec{0}\|^2$ using the second cluster of weakly coupled oscillators; and a third memory for storing a characterization of the third degree of match for different $\|\vec{T}'-\vec{0}\|^2$ using the third cluster of weakly coupled oscillators.

23. The device of claim 21:

wherein the second cluster of weakly coupled oscillators is the first cluster of weakly coupled oscillators; and wherein the third cluster of weakly coupled oscillators is the first cluster of weakly coupled oscillators.

24. The device of claim 21 wherein:

the first cluster of weakly coupled oscillators comprises a resonant body oscillator or a spin torque oscillator;

the second cluster of weakly coupled oscillators comprises a resonant body oscillator or a spin torque oscillator; and the third cluster of weakly coupled oscillators comprises a resonant body oscillator or a spin torque oscillator.

25. The device of claim 21 wherein:

each of the second and third clusters of weakly coupled oscillators comprises:
 a plurality of difference circuits, each respective difference circuit having a respective difference output;
 a plurality of oscillators, each respective oscillator having a respective input coupled to a respective difference output, and having a respective oscillator output;
 a summer for adding the respective oscillator outputs; and
 an integrator for integrating over a plurality of cycles of the oscillators and having an integrator output for providing a first, second or third, respectively, degree of match.

26. The device of claim 25 wherein:

each difference circuit comprises a transconductance amplifier; and each oscillator comprises a time encoded oscillator comprising:
 a summer coupled to the difference circuit;
 an integrator coupled to the summer;
 a hysteresis quantizer coupled to the integrator; and
 a 1-bit digital to analog converter coupled to the hysteresis quantizer having an output coupled to the summer.

27. The device of claim 25 wherein:

each difference circuit comprises an analog voltage difference circuit; and each oscillator comprises:
 a voltage controlled oscillator or a voltage controlled relaxation oscillator.

* * * * *